US012623245B2

(12) United States Patent
Ren et al.

(10) Patent No.: US 12,623,245 B2
(45) Date of Patent: May 12, 2026

(54) CHAIN-TYPE ROLLER COATING APPARATUS AND USE THEREOF

(71) Applicant: CHANGZHOU SHICHUANG ENERGY CO., LTD, Jiangsu (CN)

(72) Inventors: Changrui Ren, Jiangsu (CN); Min Wang, Jiangsu (CN); Hao Pan, Jiangsu (CN); Yun Zhang, Jiangsu (CN)

(73) Assignee: CHANGZHOU SHICHUANG ENERGY CO., LTD, Jiangsu (CN)

( * ) Notice: Subject to any disclaimer, the term of this patent is extended or adjusted under 35 U.S.C. 154(b) by 471 days.

(21) Appl. No.: 18/282,798

(22) PCT Filed: Sep. 14, 2021

(86) PCT No.: PCT/CN2021/118305

§ 371 (c)(1),
(2) Date: Sep. 19, 2023

(87) PCT Pub. No.: WO2022/193580

PCT Pub. Date: Sep. 22, 2022

(65) Prior Publication Data

US 2024/0165651 A1 May 23, 2024

(30) Foreign Application Priority Data

Mar. 19, 2021 (CN) ......................... 202110296523.5

(51) Int. Cl.
*B05C 1/08* (2006.01)

(52) U.S. Cl.
CPC .......... *B05C 1/0882* (2013.01); *B05C 1/0813* (2013.01); *B05C 1/0821* (2013.01)

(58) Field of Classification Search
CPC .... B05C 1/0821; B05C 1/0813; B05C 1/0882
See application file for complete search history.

(56) References Cited

U.S. PATENT DOCUMENTS 3,605,687 A 9/1971 Russell

FOREIGN PATENT DOCUMENTS

CN 201405736 2/2010
CN 105547123 5/2016
(Continued)

OTHER PUBLICATIONS

Machine translation of CN 211488323 U (Year: 2020).*
(Continued)

*Primary Examiner* — Vishal I Patel
(74) *Attorney, Agent, or Firm* — JCIPRNET

(57) ABSTRACT

The present application provides a chain-type roller coating apparatus, including a liquid coating roller and a synchronizing wheel. The synchronizing wheel is provided with a mounting hole. A proximity switch is arranged on an outer side of the synchronizing wheel. The synchronizing wheel is further provided with a trigger element which is configured to be sensed by the proximity switch. The liquid coating roller is assembled with the mounting hole of the synchronizing wheel by a connecting shaft. A shaft main body of the connecting shaft is equipped with a rotation support device configured to support a rotation of the shaft main body. The rotation support device is equipped with a first lifting driving device configured to drive the rotation support device to ascend or descend vertically. A ranging sensor is arranged exactly above the liquid coating roller.

18 Claims, 2 Drawing Sheets

(56) References Cited

FOREIGN PATENT DOCUMENTS

| | | |
|---|---|---|
| CN | 210632372 | 5/2020 |
| CN | 111604215 | 9/2020 |
| CN | 211488323 | 9/2020 |
| CN | 212596736 | 2/2021 |
| CN | 212681497 | 3/2021 |
| CN | 112871551 | 6/2021 |

OTHER PUBLICATIONS

"International Search Report (Form PCT/ISA/210) of PCT/CN2021/118305," mailed on Dec. 22, 2021, with English translation thereof, pp. 1-6.

* cited by examiner

CHAIN-TYPE ROLLER COATING APPARATUS AND USE THEREOF

CROSS-REFERENCE TO RELATED APPLICATION

This application is a 371 of international application of PCT application serial no. PCT/CN2021/118305, filed on Sep. 14, 2021, which claims the priority benefit of China application serial no. 202110296523.5, filed on Mar. 19, 2021. The entirety of the above-mentioned patent application is hereby incorporated by reference herein and made a part of this specification.

BACKGROUND

Technical Field

The present disclosure relates to the photovoltaic field, and specifically to a chain-type roller coating apparatus and use thereof.

Description of Related Art

In the production process of solar cells, silicon wafers need to be subjected to dopant diffusion treatment. Dopant diffusion can be divided into two steps: source deposition and source drive-in. The source deposition is to deposit a dopant source on a surface of a silicon wafer. The source drive-in is to perform heat treatment on the silicon wafer with the dopant source deposited, so that dopant elements diffuse into the silicon wafer.

A liquid dopant source may be used in the source deposition. The liquid dopant source is uniformly roller-coated on the surface of the silicon wafer by using a liquid coating roller. To supply the liquid dopant source to the liquid coating roller, a liquid squeezing roller, a liquid taking roller, and a liquid reservoir need to be arranged for the liquid coating roller. The liquid reservoir stores the liquid dopant source. A lower portion of the liquid taking roller is immersed in the liquid reservoir, and an upper portion of the liquid taking roller is located above the liquid reservoir. The liquid coating roller is located on an outer side of the liquid reservoir. The liquid squeezing roller is located between the liquid taking roller and the liquid coating roller. Two sides of the liquid squeezing roller are respectively in contact with the liquid taking roller and the liquid coating roller. The liquid dopant source is taken out from the liquid reservoir by the liquid taking roller. The liquid dopant source on the liquid taking roller is transferred to the liquid squeezing roller, rolled evenly by the liquid squeezing roller, then transferred to the liquid coating roller, and coated onto the surface of the silicon wafer by the liquid coating roller.

The liquid coating roller is a sponge roller having a soft outer surface, so as not to damage the silicon wafer. In the roller coating process, to ensure that the liquid squeezing roller can stably transfer the liquid dopant source to the sponge roller, it is necessary to control the degree by which the liquid squeezing roller is pressed into the sponge roller, so that a part of the sponge roller in contact with the liquid squeezing roller is in a local squeezed state. After shutdown, if the sponge roller remains in the local squeezed state for a long time, the sponge roller undergoes serious deformation, affecting the roller coating effect. Therefore, it is necessary to design a chain-type roller coating apparatus that can adjust the position of the liquid coating roller.

SUMMARY

Technical Solutions

The present disclosure provides a chain-type roller coating apparatus that can adjust the position of a liquid coating roller, including a roller bed configured to convey a silicon wafer and a liquid coating roller horizontally arranged and configured for roller-coating a dopant source onto the silicon wafer on the roller bed,

- the roller bed includes a plurality of conveying rollers arranged sequentially along a conveying direction of the roller bed and a transmission mechanism configured to drive the plurality of conveying rollers to rotate; and the plurality of conveying rollers are horizontally arranged and parallel to each other;
- the liquid coating roller is parallel to the plurality of conveying rollers; the liquid coating roller is equipped with a synchronizing wheel configured to drive the liquid coating roller to rotate, the synchronizing wheel is located on an outer side of an axial end of the liquid coating roller, an axis of the synchronizing wheel is parallel to an axis of the liquid coating roller, and the axis of the synchronizing wheel and the axis of the liquid coating roller are located in an identical vertical plane; and the synchronizing wheel is equipped with a driving mechanism configured to drive the synchronizing wheel to rotate;
- the synchronizing wheel is further provided with a mounting hole, the mounting hole is a straight elongated hole, the mounting hole extends along a radial direction of the synchronizing wheel, and the mounting hole extends across the axis of the synchronizing wheel; a proximity switch is further arranged on an outer side of the synchronizing wheel, and the proximity switch and the axis of the synchronizing wheel are located in an identical vertical plane; the synchronizing wheel is further provided with a trigger element which is configured to be sensed by the proximity switch, the trigger element is located outside the mounting hole, and the trigger element and the mounting hole are located on an identical straight line; the trigger element is configured to rotate with the synchronizing wheel, and when the trigger element is rotated to a position in which the trigger element is sensed by the proximity switch, the trigger element and the axis of the synchronizing wheel are located in an identical vertical plane;
- the liquid coating roller is assembled with the synchronizing wheel by a connecting shaft; the connecting shaft includes a shaft main body which is connected to the liquid coating roller and coaxial with the liquid coating roller, and a shaft protrusion portion which extends from an end of the shaft main body away from the liquid coating roller and is inserted into the mounting hole; the shaft protrusion portion is slidably engaged with the mounting hole;
- the shaft main body of the connecting shaft is equipped with a rotation support device configured to support a rotation of the shaft main body, and the rotation support device is located between the liquid coating roller and the synchronizing wheel; the rotation support device is equipped with a first lifting driving device configured to drive the rotation support device to ascend or descend vertically; and
- a ranging sensor is arranged exactly above the liquid coating roller.

Preferably, the synchronizing wheel, the proximity switch, the first lifting driving device, and the ranging sensor are supported by a frame.

Preferably, the liquid coating roller is equipped with a feeding mechanism configured to supply the dopant source to the liquid coating roller; the feeding mechanism includes a liquid reservoir configured to store a liquid dopant source, and a liquid taking roller and a liquid squeezing roller which are configured to transfer the liquid dopant source in the liquid reservoir to the liquid coating roller, and the liquid reservoir, the liquid taking roller, and the liquid squeezing roller are supported by the frame; the liquid taking roller and the liquid squeezing roller are horizontally arranged and parallel to the plurality of conveying rollers; a lower portion of the liquid taking roller is immersed in the liquid reservoir, and an upper portion of the liquid taking roller is located above the liquid reservoir; the liquid coating roller is located on an outer side of the liquid reservoir; and the liquid squeezing roller is located between the liquid taking roller and the liquid coating roller, and two sides of a bottom portion of the liquid squeezing roller are respectively in contact with the liquid taking roller and the liquid coating roller.

Preferably, the frame is equipped with a second lifting driving device configured to drive the frame to ascend or descend vertically.

Preferably, the mounting hole is a rectangular hole, and the shaft protrusion portion is in a shape of a rectangular bar.

Preferably, the shaft protrusion portion is coaxial with the shaft main body.

Preferably, the rotation support device includes a bearing sleeved over the shaft main body and a connecting member connected to the bearing and the first lifting driving device.

Preferably, the first lifting driving device is a linear motor or a linear cylinder.

Preferably, the trigger element is arranged on an outer end surface of the synchronizing wheel.

Preferably, the proximity switch is located above the synchronizing wheel, and the trigger element extends to a periphery of the synchronizing wheel.

The present disclosure also provides a use of the chain-type roller coating apparatus, where the chain-type roller coating apparatus is applied to a chain-type diffusion process, a chain-type gettering process, or a laser-doped selective emitter (SE) process.

Beneficial Effects

The advantages and beneficial effects of the present disclosure are as follows. In the chain-type roller coating apparatus of the present disclosure, a spacing between the liquid coating roller and the liquid squeezing roller can be adjusted, the degree by which the liquid squeezing roller is pressed into the liquid coating roller can be controlled, and the separation of the liquid coating roller from the liquid squeezing roller can also be realized, to avoid the serious deformation of the liquid coating roller due to the liquid coating roller still being in the local squeezed state after shutdown, thereby prolonging the service life of the liquid coating roller, and ensuring the roller coating effect.

The chain-type roller coating apparatus of the present disclosure is applicable to a chain-type diffusion process, a chain-type gettering process, or a laser-doped selective emitter process, and the chain-type roller coating apparatus is suitable for producing TOPCon (Tunnel Oxide Passivated Contact) cells or HJT (Heterojunction) cells, and realizes a fully automated production line, thereby improving the production efficiency.

DESCRIPTION OF THE EMBODIMENTS

The specific embodiments of the present disclosure will be described in further detail with reference to the accompanying drawings and examples. The following embodiments are merely used for more clearly describing the technical solutions of the present disclosure, and are not intended to limit the protection scope of the present disclosure.

The following technical solutions are employed in the present disclosure.

Figure 1:
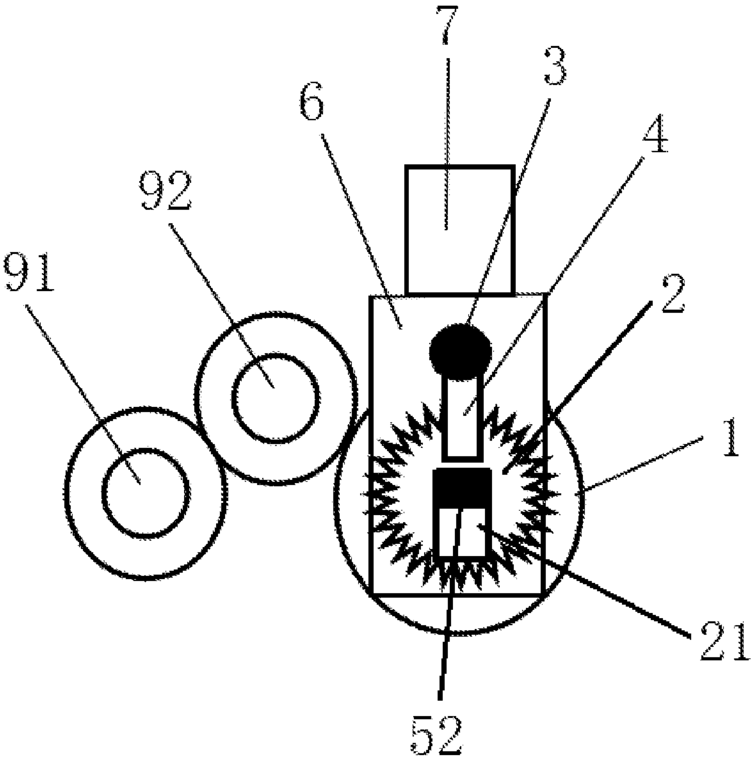
FIG. 1 is a schematic side view of the present disclosure.
Figure 2:
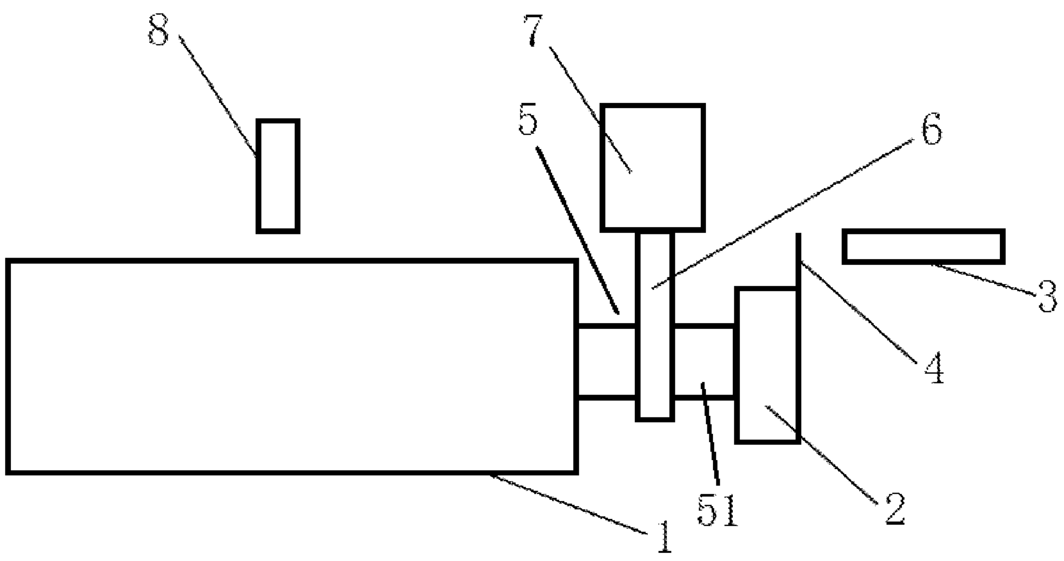
FIG. 2 is a schematic front view of the present disclosure.

As shown in FIG. 1 and FIG. 2, a chain-type roller coating apparatus includes a roller bed configured to convey a silicon wafer and a liquid coating roller 1 horizontally arranged and configured for roller-coating a dopant source onto the silicon wafer on the roller bed.

The roller bed includes a plurality of conveying rollers arranged sequentially along a conveying direction of the roller bed and a transmission mechanism configured to drive the plurality of conveying rollers to rotate. The plurality of conveying rollers are horizontally arranged and parallel to each other.

The liquid coating roller 1 is parallel to the plurality of conveying rollers. The liquid coating roller 1 is equipped with a synchronizing wheel 2 configured to drive the liquid coating roller 1 to rotate. The synchronizing wheel 2 is located on an outer side of an axial end of the liquid coating roller 1. An axis of the synchronizing wheel 2 is parallel to an axis of the liquid coating roller 1, and the axis of the synchronizing wheel 2 and the axis of the liquid coating roller 1 are located in an identical vertical plane. The synchronizing wheel 2 is equipped with a driving mechanism configured to drive the synchronizing wheel 2 to rotate.

The synchronizing wheel 2 is further provided with a mounting hole 21. The mounting hole 21 is a straight elongated hole. The mounting hole 21 extends along a radial direction of the synchronizing wheel 2. The mounting hole 21 extends across the axis of the synchronizing wheel 2. A proximity switch 3 is further arranged on an outer side of the synchronizing wheel 2. The proximity switch 3 and the axis of the synchronizing wheel 2 are located in an identical vertical plane. The synchronizing wheel 2 is further provided with a trigger element 4 which is configured to be sensed by the proximity switch 3. The trigger element 4 is located outside the mounting hole 21, and the trigger element 4 and the mounting hole 21 are located on an identical straight line. The proximity switch 3 is located above the synchronizing wheel 2, the trigger element 4 is arranged on an outer end surface of the synchronizing wheel 2, and the trigger element 4 extends to a periphery of the synchronizing wheel 2. The trigger element 4 is configured to rotate with the synchronizing wheel 2, and when the trigger element 4 is rotated to a position in which the trigger element is sensed by the proximity switch 3, the trigger element 4 and the axis of the synchronizing wheel 2 are located in an identical vertical plane.

The liquid coating roller 1 is assembled with the synchronizing wheel 2 by a connecting shaft 5. The connecting shaft

5 includes a shaft main body 51 which is connected to the liquid coating roller 1 and coaxial with the liquid coating roller 1, and a shaft protrusion portion 52 which extends from an end of the shaft main body 51 away from the liquid coating roller 1 and is inserted into the mounting hole 21. The shaft protrusion portion 52 is coaxial with the shaft main body 51. The mounting hole 21 is a rectangular hole, and the shaft protrusion portion 52 is in a shape of a rectangular bar. The shaft protrusion portion 52 is slidably engaged with the mounting hole 21.

The shaft main body 51 of the connecting shaft 5 is equipped with a rotation support device 6 configured to support a rotation of the shaft main body 51. The rotation support device 6 is located between the liquid coating roller 1 and the synchronizing wheel 2. The rotation support device 6 is equipped with a first lifting driving device 7 configured to drive the rotation support device 6 to ascend or descend vertically. The first lifting driving device 7 is a linear motor or a linear cylinder. The rotation support device 6 includes a bearing sleeved over the shaft main body 51 and a connecting member connected to the bearing and the first lifting driving device 7.

A ranging sensor 8 is arranged exactly above the liquid coating roller 1.

The synchronizing wheel 2, the proximity switch 3, the first lifting driving device 7, and the ranging sensor 8 are supported by a frame.

The liquid coating roller 1 is equipped with a feeding mechanism configured to supply the dopant source to the liquid coating roller 1. The feeding mechanism includes a liquid reservoir configured to store a liquid dopant source, and a liquid taking roller 91 and a liquid squeezing roller 92 which are configured to transfer the liquid dopant source in the liquid reservoir to the liquid coating roller 1, and the liquid reservoir, the liquid taking roller 91, and the liquid squeezing roller 92 are supported by the frame. The liquid taking roller 91 and the liquid squeezing roller 92 are horizontally arranged and parallel to the plurality of conveying rollers. A lower portion of the liquid taking roller 91 is immersed in the liquid reservoir, and an upper portion of the liquid taking roller 91 is located above the liquid reservoir. The liquid coating roller 1 is located on an outer side of the liquid reservoir. The liquid squeezing roller 92 is located between the liquid taking roller 91 and the liquid coating roller 1, and two sides of a bottom portion of the liquid squeezing roller 92 are respectively in contact with the liquid taking roller 91 and the liquid coating roller 1. The liquid taking roller 91 and the liquid squeezing roller 92 are each independently a smooth-surface roller, a threaded roller, an anilox roller, or a patterned roller. Outer surfaces of the conveying rollers, the liquid taking roller 91, and the liquid squeezing roller 92 are all made of a corrosion-resistant and pollution-free non-metallic material.

The frame is equipped with a second lifting driving device configured to drive the frame to ascend or descend vertically.

The roller bed conveys the silicon wafer. The liquid dopant source is taken out from the liquid reservoir by the liquid taking roller 91. The liquid dopant source on the liquid taking roller 91 is transferred to the liquid squeezing roller 92, rolled evenly by the liquid squeezing roller 92, then transferred to the liquid coating roller 1, and coated onto the surface of the silicon wafer by the liquid coating roller 1. A height of the frame can be adjusted by the second lifting driving device to control the degree by which the silicon wafer is pressed into the liquid coating roller 1, thereby controlling the deposition amount of the liquid dopant source on the surface of the silicon wafer.

The liquid coating roller 1 may be a sponge roller having a soft outer surface, so as not to damage the silicon wafer. In the roller coating process, to ensure that the liquid squeezing roller 92 can stably transfer the dopant source to the sponge roller, it is necessary to control the degree by which the liquid squeezing roller 92 is pressed into the sponge roller, so that a part of the sponge roller in contact with the liquid squeezing roller 92 is in a local squeezed state. After shutdown, the liquid coating roller 1 needs to be separated from the liquid squeezing roller 92, to avoid serious deformation of the liquid coating roller 1 due to the liquid coating roller 1 still being in the local squeezed state after shutdown.

To control the degree by which the liquid squeezing roller 92 is pressed into the sponge roller or to separate the liquid coating roller 1 from the liquid squeezing roller 92, the chain-type roller coating apparatus of the present disclosure is required to be capable of adjusting the position of the liquid coating roller 1. To be specific, the chain-type roller coating apparatus of the present disclosure is required to be capable of adjusting the spacing between the liquid coating roller 1 and the liquid squeezing roller 92.

In the present disclosure, the liquid coating roller 1 is assembled with the synchronizing wheel 2 by the connecting shaft 5, the shaft protrusion portion 52 of the connecting shaft 5 is inserted into the mounting hole 21 of the synchronizing wheel 2, both the liquid coating roller 1 and the connecting shaft 5 are supported by the rotation support device 6, and the rotation support device 6 is supported by the first lifting driving device 7.

When the liquid coating roller 1 operates normally, the liquid coating roller 1 is approximately coaxial with the synchronizing wheel 2, and the synchronizing wheel 2 drives, through the connecting shaft 5, the liquid coating roller 1 to rotate.

To adjust the spacing between the liquid coating roller 1 and the liquid squeezing roller 92, the second lifting driving device drives the frame to ascend, so that the liquid coating roller 1 is completely separated from the roller bed. Then, the synchronizing wheel 2 is rotated to cause the trigger element 4 to rotate, so that the trigger element 4 is rotated to the position in which the trigger element 4 can be sensed by the proximity switch 3. Upon detecting the trigger element 4, the proximity switch 3 stops the rotation of the synchronizing wheel 2. In this case, the trigger element 4 and the axis of the synchronizing wheel 2 are located in the identical vertical plane, the trigger element 4 and the mounting hole 21 are located on the identical straight line, and the mounting hole 21 extends along the radial direction of the synchronizing wheel 2 and extends across the axis of the synchronizing wheel 2. Therefore, when the trigger element 4 is rotated to the position in which the trigger element 4 can be sensed by the proximity switch 3, the mounting hole 21 is in a vertical state, i.e., the mounting hole 21 is in a state allowing the shaft protrusion portion 52 to move vertically in the mounting hole 21. After the mounting hole 21 enters the vertical state, the vertical positions of the rotation support device 6, the connecting shaft 5, and the liquid coating roller 1 may be adjusted by the first lifting driving device 7, so that the liquid coating roller 1 can move relative to the liquid squeezing roller 92 in the vertical direction. A displacement of the liquid coating roller 1 in the vertical direction may be detected by the ranging sensor 8, so as to control the spacing between the liquid coating roller 1 and the liquid squeezing roller 92, and further adjust the degree by which the liquid squeezing roller 92 is pressed into the liquid coating roller 1 or separate the liquid coating roller 1 from the liquid squeezing roller 92.

As can be seen from the above, in the chain-type roller coating apparatus of the present disclosure, the spacing between the liquid coating roller 1 and the liquid squeezing roller 92 can be adjusted, the degree by which the liquid squeezing roller 92 is pressed into the liquid coating roller 1 can be controlled, and the separation of the liquid coating roller 1 from the liquid squeezing roller 92 can also be realized, to avoid the serious deformation of the liquid coating roller 1 due to the liquid coating roller 1 still being in the local squeezed state after shutdown, thereby prolonging the service life of the liquid coating roller 1, and ensuring the roller coating effect.

The chain-type roller coating apparatus of the present disclosure is applicable to a chain-type diffusion process, a chain-type gettering process, or a laser-doped selective emitter (SE) process, and the chain-type roller coating apparatus is suitable for producing TOPCon cells or HJT cells, and realizes a fully automated production line, thereby improving the production efficiency.

While preferred embodiments of the present disclosure have been described above, the present disclosure is not limited thereto. It should be appreciated that some improvements and modifications can be made by those skilled in the art without departing from the technical principles of the present disclosure, which are also contemplated to be within the scope of the present disclosure.

What is claimed is:

1. A chain-type roller coating apparatus, comprising a roller bed configured to convey a silicon wafer and a liquid coating roller horizontally arranged and configured for roller-coating a dopant source onto the silicon wafer on the roller bed, wherein the roller bed comprises a plurality of conveying rollers arranged sequentially along a conveying direction of the roller bed and a transmission mechanism configured to drive the plurality of conveying rollers to rotate; the plurality of conveying rollers are horizontally arranged and parallel to each other; the liquid coating roller is parallel to the plurality of conveying rollers; the liquid coating roller is equipped with a synchronizing wheel configured to drive the liquid coating roller to rotate, the synchronizing wheel is located on an outer side of an axial end of the liquid coating roller, an axis of the synchronizing wheel is parallel to an axis of the liquid coating roller, and the axis of the synchronizing wheel and the axis of the liquid coating roller are located in an identical vertical plane; the synchronizing wheel is equipped with a driving mechanism configured to drive the synchronizing wheel to rotate; the synchronizing wheel is further provided with a mounting hole, the mounting hole is a straight elongated hole, the mounting hole extends along a radial direction of the synchronizing wheel, and the mounting hole extends across the axis of the synchronizing wheel; a proximity switch is further arranged on an outer side of the synchronizing wheel, and the proximity switch and the axis of the synchronizing wheel are located in an identical vertical plane; the synchronizing wheel is further provided with a trigger element which is configured to be sensed by the proximity switch, the trigger element is located outside the mounting hole, and the trigger element and the mounting hole are located on an identical straight line; the trigger element is configured to rotate with the synchronizing wheel, and when the trigger element is rotated to a position in which the trigger element is sensed by the proximity switch, the trigger element and the axis of the synchronizing wheel are located in an identical vertical plane; the liquid coating roller is assembled with the synchronizing wheel by a connecting shaft; the connecting shaft comprises a shaft main body which is connected to the liquid coating roller and coaxial with the liquid coating roller, and a shaft protrusion portion which extends from an end of the shaft main body away from the liquid coating roller and is inserted into the mounting hole; the shaft protrusion portion is slidably engaged with the mounting hole; the shaft main body of the connecting shaft is equipped with a rotation support device configured to support a rotation of the shaft main body, and the rotation support device is located between the liquid coating roller and the synchronizing wheel; the rotation support device is equipped with a first lifting driving device configured to drive the rotation support device to ascend or descend vertically; and a ranging sensor is arranged exactly above the liquid coating roller.

2. The chain-type roller coating apparatus according to claim 1, wherein the synchronizing wheel, the proximity switch, the first lifting driving device, and the ranging sensor are supported by a frame.

3. The chain-type roller coating apparatus according to claim 2, wherein the liquid coating roller is equipped with a feeding mechanism configured to supply the dopant source to the liquid coating roller; the feeding mechanism comprises a liquid reservoir configured to store a liquid dopant source, and a liquid taking roller and a liquid squeezing roller which are configured to transfer the liquid dopant source in the liquid reservoir to the liquid coating roller, and the liquid reservoir, the liquid taking roller, and the liquid squeezing roller are supported by the frame; the liquid taking roller and the liquid squeezing roller are horizontally arranged and parallel to the plurality of conveying rollers; a lower portion of the liquid taking roller is immersed in the liquid reservoir, and an upper portion of the liquid taking roller is located above the liquid reservoir; the liquid coating roller is located on an outer side of the liquid reservoir; and the liquid squeezing roller is located between the liquid taking roller and the liquid coating roller, and two sides of a bottom portion of the liquid squeezing roller are respectively in contact with the liquid taking roller and the liquid coating roller.

4. The chain-type roller coating apparatus according to claim 3, wherein the frame is equipped with a second lifting driving device configured to drive the frame to ascend or descend vertically.

5. The chain-type roller coating apparatus according to claim 1, wherein the mounting hole is a rectangular hole, and the shaft protrusion portion is in a shape of a rectangular bar.

6. The chain-type roller coating apparatus according to claim 1, wherein the shaft protrusion portion is coaxial with the shaft main body.

7. The chain-type roller coating apparatus according to claim 1, wherein the rotation support device comprises a bearing sleeved over the shaft main body and a connecting member connected to the bearing and the first lifting driving device.

8. The chain-type roller coating apparatus according to claim 1, wherein the first lifting driving device is a linear motor or a linear cylinder.

9. The chain-type roller coating apparatus according to claim 1, wherein the trigger element is arranged on an outer end surface of the synchronizing wheel.

10. The chain-type roller coating apparatus according to claim 1, wherein the proximity switch is located above the synchronizing wheel, and the trigger element extends to a periphery of the synchronizing wheel.

11. An use of the chain-type roller coating apparatus according to claim 1, wherein the chain-type roller coating apparatus is applied to a chain-type diffusion process, a chain-type gettering process, or a laser-doped selective emitter (SE) process.

12. The chain-type roller coating apparatus according to claim 4, wherein the mounting hole is a rectangular hole, and the shaft protrusion portion is in a shape of a rectangular bar.

13. The chain-type roller coating apparatus according to claim 4, wherein the shaft protrusion portion is coaxial with the shaft main body.

14. The chain-type roller coating apparatus according to claim 4, wherein the rotation support device comprises a bearing sleeved over the shaft main body and a connecting member connected to the bearing and the first lifting driving device.

15. The chain-type roller coating apparatus according to claim 4, wherein the first lifting driving device is a linear motor or a linear cylinder.

16. The chain-type roller coating apparatus according to claim 4, wherein the trigger element is arranged on an outer end surface of the synchronizing wheel.

17. The chain-type roller coating apparatus according to claim 4, wherein the proximity switch is located above the synchronizing wheel, and the trigger element extends to a periphery of the synchronizing wheel.

18. An use of the chain-type roller coating apparatus according to claim 16, wherein the chain-type roller coating apparatus is applied to a chain-type diffusion process, a chain-type gettering process, or a laser-doped selective emitter (SE) process.

* * * * *